United States Patent [19]
Bowen

[11] 3,721,279
[45] March 20, 1973

[54] WOOD LATHE

[76] Inventor: Charlie L. Bowen, 1109 East Tenth Street, Lumberton, N.C. 28358

[22] Filed: Jan. 21, 1971

[21] Appl. No.: 108,514

[52] U.S. Cl. ........................................142/1, 142/48
[51] Int. Cl. ..............................B27c 7/06, B27c 7/02
[58] Field of Search......142/1, 8, 16, 46, 48; 144/1 C

[56] References Cited

UNITED STATES PATENTS

| | | | |
|---|---|---|---|
| 101,329 | 3/1870 | Warren | 142/1 |
| 3,410,326 | 11/1968 | Paquin | 142/1 |
| 1,779,085 | 10/1930 | Blasi | 142/48 |
| 1,876,992 | 9/1932 | MacLeod | 142/1 |
| 399,871 | 3/1889 | Gebhardt | 142/48 |

*Primary Examiner*—Leonidas Vlachos

[57] ABSTRACT

A wood turning lathe for handling objects from 6 to 40 inches round and up to 30 inches in length, the device comprising a frame around a large central space which affords sufficient space or room for a large object to swing, and the frame affording a motor driven chuck and a spindle unit between which the work is rotatably carried.

2 Claims, 3 Drawing Figures

INVENTOR
CHARLIE L. BOWEN

WOOD LATHE

This invention relates generally to wood working machinery. More specifically it relates to wood turning lathes.

A principal object of the present invention is to provide a lathe for turning wood and which has self-contained means so as to round out any wooden object that has been sawed anywhere round from 6 to 40 inches.

Another object of the present invention is to provide a wood lathe which can turn straight timber up to 30 inches long.

Yet another object of the present invention is to provide a wood turning lathe upon which an item such as an ottoman after being sawed and glued in the rough and is very unlevel, can now be leveled by this lathe in approximately 5 minutes.

Other objects of the present invention are to provide a wood turning lathe which is simple in design, inexpensive to manufacture, rugged in construction, easy to use and efficient in operation.

These and other objects will be readily evident upon a study of the following specification together with the accompanying drawing wherein.

Figure 1:
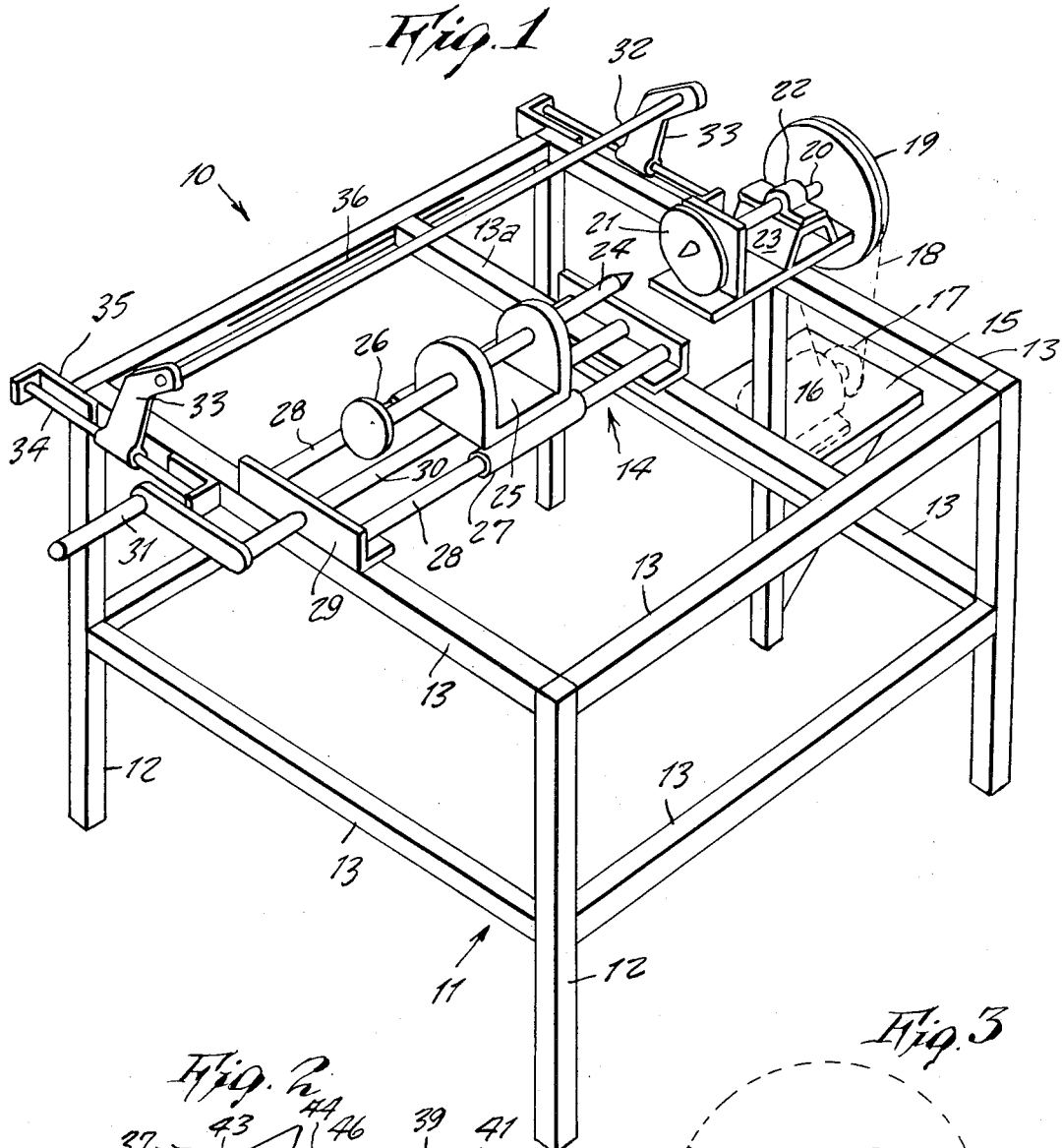
FIG. 1 is a perspective view of the present invention.

Referring now to the drawing in detail, and more particularly at this time to FIG. 1 thereof, the reference numeral 10 represents a wood turning lathe, according to the present invention wherein there is a frame 11 which includes a plurality of four vertical legs 12 and horizontally extending beams 13 and upon which there is supported a working mechanism 14.

At one end of the frame 11 there is a sidewardly extending platform 15 upon which an electric motor 16 is mounted, the motor having a pulley 17 for driving an endless belt 18 which is passed around a pulley 19 affixed upon a shaft 20 and which at its opposite end carries a chuck 21 for engaging a work being turned.

A shaft 20 is supported rotatably free in a bearing 22 carried upon a supporting structure 23 that is mounted upon the frame 11.

An adjustable work retaining spindle 24 includes a three-quarter inch standard thread for being adjustably carried in a bracket 25 with corresponding threaded openings through which the spindle extends.

The spindle is selectively able to be locked by means of a lock nut 26 in position. The bracket 25 is integral with a pair of sleeves 27 adjustably slideable along parallel shafts 28. The shafts 28 at their opposite ends are secured upon angle irons 29 which are supported upon transverse extending beams 13 of the frame 11.

A threaded shaft 30 threadingly engages the under side of the bracket 25, one end of the threaded shaft having a crank handle 31 so to rotate the same and thus be able to move the spindle carrying bracket away or toward the chuck 21. It is to be noted that the spindle 24 is in alignment with the shaft 22, the spindle being pointed at its end for engaging the work, as shown in the drawing. A chisel cutting tool rest 32 comprises an elongated bar that extends parallel to the axis of the spindle 24 and shaft 20, the bar 32 being supported at its opposite ends upon brackets 33 each one of which is slideable along a transverse extending shaft 34 supported at its opposite ends within angle brackets 35 that are secured to the outer side of frame 11.

Thus a means whereby the cutting tool can engage the work while it is turning upon the lathe has been provided. The intermediate beam 13a is adjustable by being slideable at its ends along grooves 36 of the frame so to permit the beam to move out of the way for longer work being turned upon the lathe.

Thus there is provided a wood turning lathe that can round out wooden objects that have been sawed anywhere round from 6 to 40 inches and which also will turn straight timber to 30 inches long. It is of course understood that the timber is not over 7 inches in width.

Figure 2:
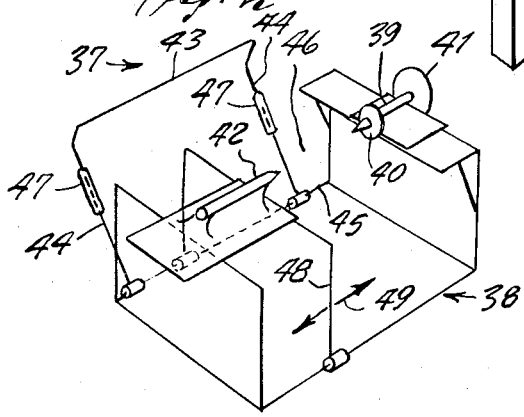
FIG. 2 is a perspective schamatic view of a modified design thereof; and which is designed to hold a maximum size of work being turned.
Figure 3:
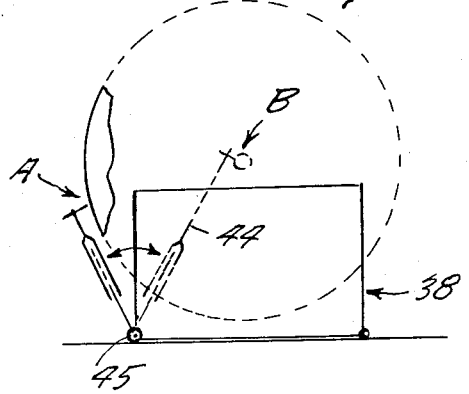
FIG. 3 is an end elevation view thereof showing a telescopic tool rest leg so to accommodate different size works as is indicated by the two examples illustrated in the Figure.

Referring now to FIGS. 2 and 3 of the drawing, there is shown a modified design of the wood turning lathe which incorporates all the principles of the invention as is above described but wherein an even larger diameter work can be turned.

In FIGS. 2 and 3 there is shown a wooden turning lathe 37 which includes a frame 38 which at one end supports the shaft 39 carrying the chuck 40. The shaft 39 having a pulley 41 mounted thereupon for engaging the endless belt powered by the electric motor (not shown). The opposite end of the frame 38 supports the spindle unit 42 which may comprise the identical structure as above described and as illustrated in FIG. 1, but wherein the same is illustrated only symbolically in FIG. 2.

In the present invention, the chisel cutting tool rest 43 is pivotable about arms 44 which at their opposite ends are pivotable about a frame beam 45 located at the bottom of the frame so that the tool rest 43 can be brought out of the way for even the largest work to be turned, as indicated by the deep space 46 formed in the frame 38.

Additionally, as shown in FIG. 3, the arms 44 are telescopic, as shown at 47 so that the tool rest can be positioned tangentially to different diameter work as indicated in the two examples as illustrated at A and B shown in FIG. 3. In the first example, the work is relatively large whereas in the latter example the work is relatively small. Additionally as shown in FIG. 2, the forward support 48 of spindle unit is slideable into either direction as indicated by arrow 49 so to permit a relatively long work to be fitted between the spindle and the chuck.

Thus there has been provided a modified form of the invention so to gain a maximum effectiveness for turning a large work.

What I now claim is:

1. In a wood lathe, the combination of a frame including a plurality of four vertical legs and horizontally extending beams and upon which a working mechanism is supported, a sideward platform upon which an electric motor is mounted, a pulley on a shaft of said motor, and endless belt around said pulley and around a second pulley secured upon a shaft carrying a chuck, said shaft being supported upon said frame, and an adjustable spindle unit carried upon said frame, said spindle unit carrying a spindle member which is in axial alignment with said chuck, a relatively wide space between said spindle member and said chuck for positioning relatively large work there between, said spindle member being supported upon a bracket having parallel integral sleeves, a pair of parallel shafts fitted through said sleeves of said brackets so to permit said spindle member to be adjusted relatively closer or further away from said chuck, a chisel cutting tool rest being carried by said frame and comprising a bar that extends the length of said lathe, and means for moving said bar relatively closer or further away from the axis along which said spindle member and said chuck are located, said chisel cutting tool rest bar at its opposite end being integral with a pair of parallel arms which at their opposite ends are pivotable about a frame beam located at a bottom of the frame so to permit a relatively very large work to be positioned between said chuck and said spindle member.

2. The combination as set forth in claim 1, wherein each said arm is telescopic.

* * * * *